Figure 1:
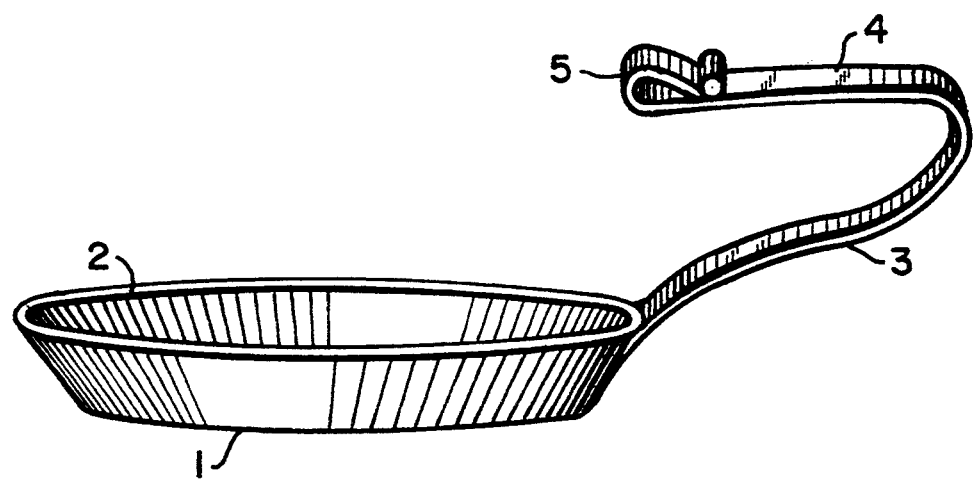

United States Patent [19]

Gaydoul

[11] Patent Number: 5,365,832
[45] Date of Patent: Nov. 22, 1994

[54] STEEL PAN

[76] Inventor: Annegret Gaydoul, Schwanheimer Str. 144, D-6140 Bensheim, Germany

[21] Appl. No.: 927,404
[22] PCT Filed: Mar. 27, 1991
[86] PCT No.: PCT/DE91/00272
  § 371 Date: Sep. 21, 1992
  § 102(e) Date: Sep. 21, 1992
[87] PCT Pub. No.: WO91/14390
  PCT Pub. Date: Oct. 3, 1991

[30] Foreign Application Priority Data

Mar. 28, 1990 [DE] Germany ............... 903593[U]

[51] Int. Cl.⁵ .................................. A47J 37/10
[52] U.S. Cl. ........................... 99/422; 16/110 A
[58] Field of Search ............. 99/422, 403, 324; 16/110 A, 110 R, 114 A, 119, 125; 126/390; 220/455

[56] References Cited

U.S. PATENT DOCUMENTS

| | | | |
|---|---|---|---|
| 116,330 | 6/1871 | Lawrence et al. | 16/114 A |
| 782,895 | 2/1905 | Breding | 99/422 |
| 784,803 | 3/1905 | Moylan | 16/114 A |
| 865,917 | 9/1907 | Kuehnlein | 16/114 A |
| 1,189,957 | 7/1916 | Jewell | 16/114 A |
| 1,470,521 | 10/1923 | Combest | 99/403 |
| 1,693,772 | 12/1928 | Allen | 16/114 A |
| 2,244,193 | 6/1943 | Guyon et al. | 99/403 |
| 2,249,144 | 7/1941 | Kleina | 16/114 A |
| 2,307,408 | 1/1943 | Kent | 99/403 |
| 2,413,204 | 12/1946 | Wolff | 126/390 |
| 2,613,978 | 10/1952 | Marulli | 16/114 A |
| 3,613,553 | 10/1971 | Popeil | 99/403 |
| 4,173,926 | 11/1979 | Brignall | 99/403 |
| 4,505,390 | 3/1985 | Kirk, Jr. | 16/110 A |
| 4,666,727 | 5/1987 | Wang | 99/422 |
| 4,681,027 | 7/1987 | Meamber | 99/422 |
| 4,854,227 | 8/1989 | Koopman | 99/403 |

FOREIGN PATENT DOCUMENTS

| | | | |
|---|---|---|---|
| 0608588 | 4/1926 | France | 16/110 A |
| 0656560 | 1/1938 | Germany . | |
| 2340680 | 3/1974 | Germany | 220/455 |
| 0002929 | of 1887 | United Kingdom | 99/403 |
| 0028527 | of 1910 | United Kingdom . | |
| 0016493 | of 1914 | United Kingdom . | |

*Primary Examiner*—Philip R. Coe
*Assistant Examiner*—James F. Hook
*Attorney, Agent, or Firm*—Karl F. Milde, Jr.

[57] ABSTRACT

A steel pan, in particular a forged steel pan, has a shaft (3) which is bent backwards at about mid length. The bent back portion of the shaft forms a handle (4) located above the part not bent back.

9 Claims, 1 Drawing Sheet

STEEL PAN

The pan according to the invention has the advantage over existing pans that it is more easily handled and less awkwardly shaped and can therefore be stored more easily. Furthermore, the handle hardly projects over the edge of the hob, whereby the danger of an accident is substantially reduced. In spite of this the grip is not unacceptably heated by the heat required for frying, since the handle length corresponds to the ruling length for heat conduction of other panhandle lengths, and can even be greater if required. The low temperature of the grip is achieved particularly by a further development in which the grip is arranged to be open in the direction of the pan.

A different further development consists in that the free end of the grip is located approximately over the edge of the pan. By this means on one hand the danger of bumps through rising steam or fat sprays is reduced, and on the other hand the ease of handling of the pan according to the invention is further improved by a favourable distribution of the weight.

According to a further development the grip is arranged to extend parallel to the floor of the pan. Hereby a relatively small height of the pan including the grip is achieved.

On the other hand it is provided that the grip extends ascending towards the inside. This form is adapted to normal handling and is ergonomically still more advantageous. Over and above that such a grip contributes to the person handling the pan standing straight and further away from the heat source.

In an advantageous embodiment it is provided that the grip is formed twice. In addition, a closed loop can be provided on the side opposite the handle. This is particularly advantageous with larger pans, for example with those having a diameter greater than 28 cm.

SHORT DESCRIPTION OF THE DRAWING

Figure 2:
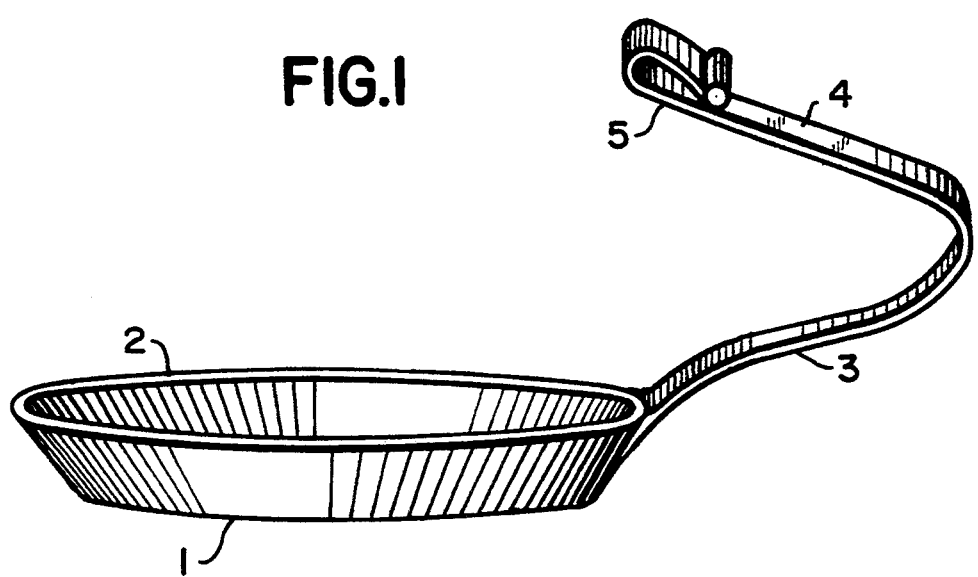

Two embodiments of the invention are represented in the drawing with the aid of several figures, and are illustrated in greater detail in the following description. There are shown in:

FIG. 1 an embodiment with an approximately horizontal grip,

FIG. 2 an embodiment with a grip ascending inwardly and

Figure 3:
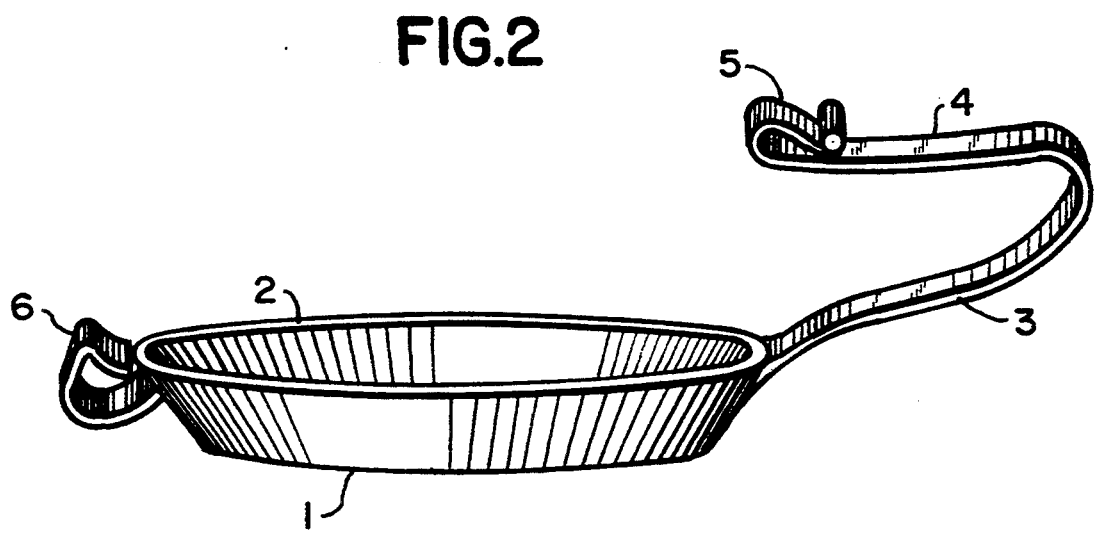

FIG. 3 an embodiment with an additional loop on the side of the pan opposite the handle.

Similar parts are provided with the same reference symbol in the figures.

Ways of Carrying Out the Invention

The embodiments in each case have a floor 1 and an edge 2 in known manner. A handle 3 rigidly fixed to the edge consists like the other parts of the pan of steel and is bent back at about half its length to a grip 4, 4'. At the end region of the grip an eye 5 is provided. The latter reduces the danger of accident by the grip which otherwise would extend relatively pointedly. The end of the grip 4, 4' is located approximately over the edge of the pan. Easy handling is achieved by the shaping of the grip in accordance with the invention since when holding the pan according to the invention the weight is effective with a substantially smaller leverage than in the known pan with an elongated handle, which is held at its outer end because of the high temperatures of the pan. There is sufficient space between the non-bent part of the handle 3 and the grip 4, 4' so that the fingers do not touch the heated part of the handle 3 by accident when taking hold of the grip 4.

While in the embodiment of FIG. 1 the grip extends about horizontally, the grip 4' in the embodiment of FIG. 2 ascends towards the inside. This direction comes to meet holding of the grip by a hand taking hold, so that handling is made easier with this pan. In addition, a person handling this pan is not tempted to lean over the pan.

In the embodiment of FIG. 3 a loop 6 is provided on the side opposite the handle 3 so that the pan can be held with both hands. Of course such a loop can also be arranged on a pan according to FIG. 2.

As can be seen from the figures, the distance between the pan or the edge and the grip 4 is sufficiently great so that a danger of burning by touching the handle 3 can be excluded. By the bent back grip 4 extending approximately over the edge 2 danger of burning by steam or sprays is largely excluded. The overhang of the bent back handle is so small that it hardly projects beyond the edge of the hob in traditional cookers. By this means the danger of accidental pulling down, particularly by children, is also reduced.

In the illustrated embodiment the end formed as an eve can also be bent to run parallel over the length of the grip 4, resulting in a double grip.

There has thus been shown and described a novel steel pan which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

I claim:

1. In a pan made of steel including a floor surrounded by an upstanding edge, said floor and said edge defining a central axis extending perpendicular to said floor, said pan further including a handle extending laterally outward on one side of the pan, the improvement wherein the handle is bent backwards toward said central axis at about half its length and wherein the bent back part of the handle forms a grip disposed substantially above the pat not bent back, said grip terminating at a free end that lies substantially outside the edge of the pan.

2. Pan according to claim 1, wherein the grip is open in the direction of the pan.

3. Pan according to claim 2, wherein the free end of the grip is situated approximately over the edge of the pan.

4. Pan according to claim 1, wherein the grip extends approximately parallel to the floor of the pan.

5. Pan according to claim 1, wherein the grip extends ascending towards the inside.

6. Pan according to claim 1, wherein the free end of the grip is formed in a loop.

7. Pan according to claim 1, wherein a closed hanging loop is provided on the side opposite the handle.

8. Pan according to claim 1, wherein the free end of the grip is also bent backwards to form a double grip with one grip above the other.

9. Pan according to claim 1, which is made of forged steel.

* * * * *